United States Patent
Mak (10) Patent No.: US 10,489,031 B2
(45) Date of Patent: *Nov. 26, 2019

(54) METHOD OF MOMENTUM BASED ZOOM OF CONTENT ON AN ELECTRONIC DEVICE

(71) Applicant: BlackBerry Limited, Ottawa (CA)

(72) Inventor: Genevieve Elizabeth Mak, Toronto (CA)

(73) Assignee: BlackBerry Limited, Waterloo (CA)

( * ) Notice: Subject to any disclaimer, the term of this patent is extended or adjusted under 35 U.S.C. 154(b) by 252 days.

This patent is subject to a terminal disclaimer.

(21) Appl. No.: 14/746,286

(22) Filed: Jun. 22, 2015

(65) Prior Publication Data

US 2015/0286380 A1 Oct. 8, 2015

Related U.S. Application Data

(63) Continuation of application No. 13/572,070, filed on Aug. 10, 2012, now Pat. No. 9,075,460.

(51) Int. Cl.
*G06F 3/0484* (2013.01)
*G06F 3/0482* (2013.01)
(Continued)

(52) U.S. Cl.
CPC .......... *G06F 3/04845* (2013.01); *G06F 3/041* (2013.01); *G06F 3/048* (2013.01);
(Continued)

(58) Field of Classification Search
CPC .................. G06F 3/04883; G06F 3/04845
See application file for complete search history.

(56) References Cited

U.S. PATENT DOCUMENTS 8,149,249 B1 4/2012 Oplinger
8,223,172 B1 * 7/2012 Miller .................. G06F 3/0481
345/660
(Continued)

FOREIGN PATENT DOCUMENTS

WO 2009053833 A1 4/2009
WO 2009084809 A1 7/2009

OTHER PUBLICATIONS

European Patent Office, Summary to Attend Oral Proceedings on Application 12180071.8, dated Jan. 13, 2016.
(Continued)

*Primary Examiner* — Rayeez R Chowdhury
(74) *Attorney, Agent, or Firm* — Moffat & Co (57) ABSTRACT

A method of interacting with a user interface displaying content on a display of an electronic device is provided. A zoom gesture is detected to modify a zoom level of the content displayed on the user interface. A momentum or kinetic value for the zoom gesture is determined and a final zoom level based on the determined momentum value of the zoom gesture is determined. The animation of the transition to the final zoom level can be adjusted to display the content on the user interface at the determined final zoom level. The content may be a webpage in a web browser where the zoom gesture is performed on regions within the content. The momentum of the zoom gesture is utilized to determine a desired region and adjust a final zoom level to align the content.

21 Claims, 8 Drawing Sheets

(51) Int. Cl.
*G06F 3/041* (2006.01)
*G06F 3/048* (2013.01)
*G06F 3/0488* (2013.01)

(52) U.S. Cl.
CPC ...... *G06F 3/04842* (2013.01); *G06F 3/04883* (2013.01); *G06F 2203/04806* (2013.01); *G06F 2203/04808* (2013.01)

(56) References Cited

U.S. PATENT DOCUMENTS

| | | | |
|---|---|---|---|
| 2007/0188473 A1 | 8/2007 | Anwar | |
| 2008/0165148 A1 | 7/2008 | Williamson et al. | |
| 2010/0289825 A1* | 11/2010 | Shin | G06F 3/04845 345/667 |
| 2011/0074710 A1 | 3/2011 | Weeldreyer et al. | |
| 2011/0102464 A1* | 5/2011 | Godavari | G06F 3/0416 345/650 |
| 2011/0199342 A1 | 8/2011 | Vartanian | G06F 3/016 345/177 |
| 2011/0202834 A1* | 8/2011 | Mandryk | G06F 3/04883 715/701 |
| 2011/0214087 A1* | 9/2011 | Nagiyama | G06F 3/016 715/784 |
| 2011/0289462 A1 | 11/2011 | Harris et al. | |
| 2011/0298830 A1* | 12/2011 | Lam | G06F 3/04883 345/661 |
| 2012/0052921 A1 | 3/2012 | Lim et al. | |
| 2012/0089950 A1 | 4/2012 | Tseng | |
| 2012/0110501 A1 | 5/2012 | Baek et al. | |
| 2012/0159386 A1* | 6/2012 | Kang | G06F 3/0481 715/800 |
| 2012/0169776 A1* | 7/2012 | Rissa | G06F 3/04883 345/676 |
| 2012/0192116 A1* | 7/2012 | Stedman | G06F 3/04883 715/863 |
| 2012/0268412 A1* | 10/2012 | Cruz-Hernandez | G06F 3/0488 345/174 |
| 2013/0305187 A1* | 11/2013 | Phillips | G06F 3/04817 715/800 |
| 2013/0326398 A1* | 12/2013 | Zuverink | G06F 3/048 715/784 |

OTHER PUBLICATIONS

Takeo Igarashi /Ken Hinckley—"Speed-dependent Automatic Zooming for Browsing Large Documents"; UIST'00 Proceedings of the 13th Annual ACM Symposium on User Interface Software and Technology; Nov. 5-8, 2000, San Diego, California, USA, pp. 139-148.

"Mobile Safari Tips and Tricks", www.appsafari/mobile-safari-tips-and-tricks/, Nov. 16, 2011.

European Patent Office, European Search Report from corresponding EP Application No. 12180071.8, dated Nov. 12, 2012.

European Patent Office, Office Action for corresponding EP Application No. 12180071.8, dated Nov. 21, 2014.

European Patent Office, Office Action on corresponding EP Application No. 12180071.8, dated May 8, 2013.

European Patent Office, Decision to refuse a European Patent application on Application No. 12180071.8, dated Jun. 15, 2016.

* cited by examiner

METHOD OF MOMENTUM BASED ZOOM OF CONTENT ON AN ELECTRONIC DEVICE

RELATED APPLICATIONS

The present application is a continuation of U.S. patent application Ser. No. 13/572,070, filed Aug. 10, 2012, the entire contents of which are incorporated herein by reference.

TECHNICAL FIELD

The current disclosure relates to interacting with a user interface of an electronic device, and in particular to zooming in and out of displayed content.

BACKGROUND

Gestures are used for interacting with content in a user interface on electronic devices. Touch gestures may be used with an electronic device having a sensor capable of detecting one or more contact points on the devices, for example a touch-sensitive display. The touch gestures may include, for example, a tap, a double tap, a tap and hold, a tap and drag, a swipe and a pinch, although other gestures are possible.

A pinch gesture is commonly used to zoom-in and zoom-out of content which can comprise initiating the gesture with two contact points. In a touch-sensitive display the zoom generally commences with an index finger and thumb of a user although the gesture is not limited to the use of the thumb and finger. The contact points are then moved towards each other to zoom-in or moved away from each other to zoom-out. The amount to zoom-in or zoom-out is determined from the distance the contact points are moved. The zoom gesture may also comprise a translation component of the contact points, which may cause the zoomed content to be translated.

The pinch-to-zoom gesture provides a convenient gesture for controlling an amount to zoom; however, it may be inconvenient, cumbersome or undesirable in certain viewing situations. For example, when zooming in on web content, such as a webpage displayed in a browser of a mobile device, the pinch-to-zoom gesture may make it difficult to both zoom the displayed content to a desired level as well as locate the zoomed content in the desired location. This may require first pinching-to-zoom the content to the desired zoom level, and then using a drag gesture to position the content in the desired location.

One attempted solution for zooming in on content displayed in a browser is to use a double tap gesture. Content displayed in a browser is often grouped in distinct regions. Double tapping a region of content may zoom to a level appropriate for the region of the double tap gesture, as well as shift the displayed content so that the double-tapped region is displayed. Double tapping again may cause the display to zoom-out to the previous zoom level. While the double tap gesture may provide some benefit, it does not allow a user to easily zoom-in, or zoom-out, to different zoom levels. Further it may be difficult to use if content is grouped in nested sections or regions. Further still, the double tap may be difficult to use, or may not function as expected, when attempting to zoom-in on a hyperlink of the content.

An improved method of interacting with content to allow zooming of the content is desirable.

BRIEF DESCRIPTION OF THE DRAWINGS

The subject matter of the appended claims will described with reference to the appended drawings, in which:

DETAILED DESCRIPTION

In accordance with an aspect of the present disclosure there is provided a method for interacting with a user interface displaying content on a display of an electronic device, the method comprising detecting a zoom gesture to modify a zoom level of the content displayed on the user interface; determining a momentum value for the zoom gesture; determining a final zoom level based on the determined momentum value of the zoom gesture; and displaying the content on the user interface at the determined final zoom level.

In accordance with another aspect of the present disclosure there is provided a device for displaying content, the device comprising: a display for displaying a user interface; a processor for executing instructions; and a memory for storing instructions for execution by the processor, the instructions when executed by the processor configuring the device to: detect a zoom gesture to modify a zoom level of the content displayed on the user interface; determine a momentum value for the zoom gesture; determine a final zoom level based on the determined momentum value of the zoom gesture; and display the content on the user interface at the determined final zoom level.

In accordance with yet another aspect of the present disclosure there is provided a non-transitory computer readable memory containing instructions for interacting with a user interface displaying content on a display of an electronic device, the instructions when executed by a processor performing the method comprising: detecting a zoom gesture to modify a zoom level of the content displayed on the user interface; determining a momentum value for the zoom gesture; determining a final zoom level based on the determined momentum value of the zoom gesture; and displaying the content on the user interface at the determined final zoom level.

As described further herein, an electronic device may provide functionality that allows a user to interact with content displayed in a user interlace of the electronic device. The functionality may allow a user to zoom-in and zoom-out using gestures in order to adjust the zoom level at which the content is displayed. A pinch-to-zoom gesture may be used to control the zoom level to display content at. The pinch-to-zoom gesture may be augmented as described further herein with functionality that determines the zoom level to display the content at based on a momentum value determined from the zoom gesture. The momentum based zoom provides the ability to zoom-in or zoom-out to a greater degree than may be possible for a particular display size using only a pinch-to-zoom gesture. Further, the momentum based zoom allows the final zoom level used for displaying the content to be determined based on what content will be displayed, which may potentially provide for an improved user experience by zooming to a level that properly displays a particular portion of the content.

Figure 1A:
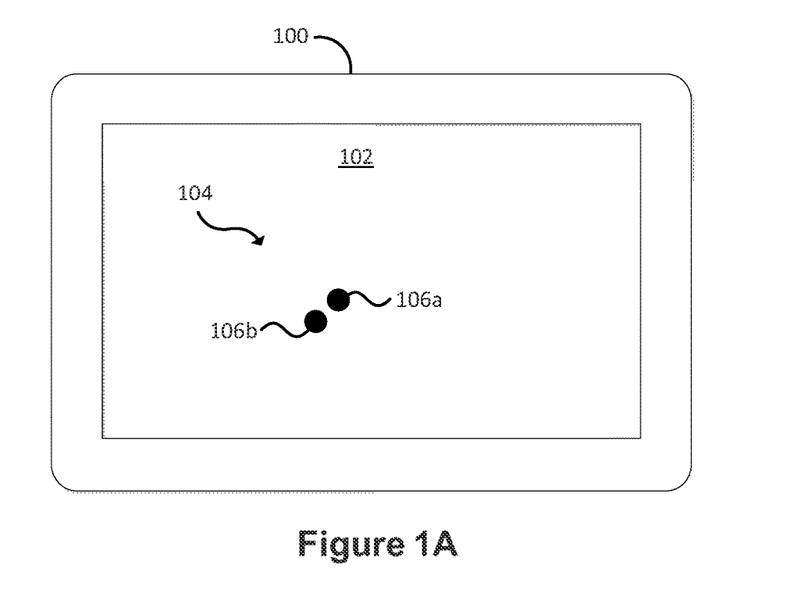
FIG. 1A depicts initiation of a momentum based zoom gesture on a touch-sensitive display of an electronic device.

FIG. 1A depicts initiation of a momentum based zoom gesture on a touch-sensitive display of an electronic device. Although the current description describes the momentum based zooming with respect to the tablet type device 100, it is contemplated that the momentum based zooming may also be implemented in devices having different form factors, including larger and smaller tablets, laptop computers, desktop computers, tabletop computers, handheld computers, smart phones as well as other computing devices that allow a user to interact with a user interface through gestures. Further, although the gestures are described as touch gestures, it is contemplated, that rather than a touch-sensitive display, an image capture device or proximity sensor, or combination thereof may be used to provide gesture detection functionality without requiring actual contact with the device.

The electronic device 100 comprises a display 102 for displaying content in a user interface. The content may be for example, a webpage displayed in a web browser, a video or picture displayed within a media application, an e-reader for providing a book, magazine or newspaper, a map displayed within a map application or other types of zoom-able content that may be displayed in the user interface. The display 102 of the device 100 may be a touch-sensitive display, allowing a user to use touch based gestures to interact with the user interface.

The user may perform gestures to interact with the user interface. The gestures may include, for example, taps, double taps, drags, flicks, pinches, presses, scrolls, fast scrolls, press and taps, press and drags, rotations, multi finger taps, multi finger drags, multi finger scrolls, as well as other gestures. A touch gesture comprises a contact point of a finger or stylus with the touch-sensitive display. The touch gesture is described by the characteristics of the contact point, including for example, a start position of the contact point, a termination position of the contact point, a duration of the contact point, and movement of the contact point. The different gestures may be associated with performing different functions. For example, a tap gesture is commonly associated with selecting or opening an item on the display that was tapped. The pinch gesture is commonly associated with zooming-out and zooming-in. Although described as a pinch gesture, it is noted that the pinch gesture is intended to include a spread gesture. The spread gesture provides the opposite functionality of the pinch gesture, and as such are commonly referred to collectively as a pinch gesture. If the pinch gesture is used to zoom-out on content, the spread gesture may be used to zoom-in on the content.

As described further herein, the pinch gesture may be augmented to incorporate a momentum or kinetic value that allows the final zoom level of the content, and optionally the alignment of the content, to be adjusted to suit the content being displayed. The pinch gesture 104 is initiated with at least two contact gestures 106a, 106b. The gesture 104 is considered as a pinch gesture for zooming-in, and as such the start positions 106a, 106b of the contact points are relatively close together in order to allow subsequent separation of the contact points to define the zoom gesture. It is noted that the zoom gesture 104 is considered as being performed with the index finger and thumb of a user's hand; however, it is contemplated that zoom gestures, whether for zooming-in or zooming-out, could be performed with different hands or fingers. Additionally, although described with regards to two contact points, it is contemplated that the pinch gesture could be performed with more than two contact points. For example, five fingers from one hand could be used in performing a momentum based zoom gesture. Further, although the momentum based gesture could be performed using more than two contact points, one or more of the contact points may not be processed in performing the momentum based zoom.

Figure 1B:
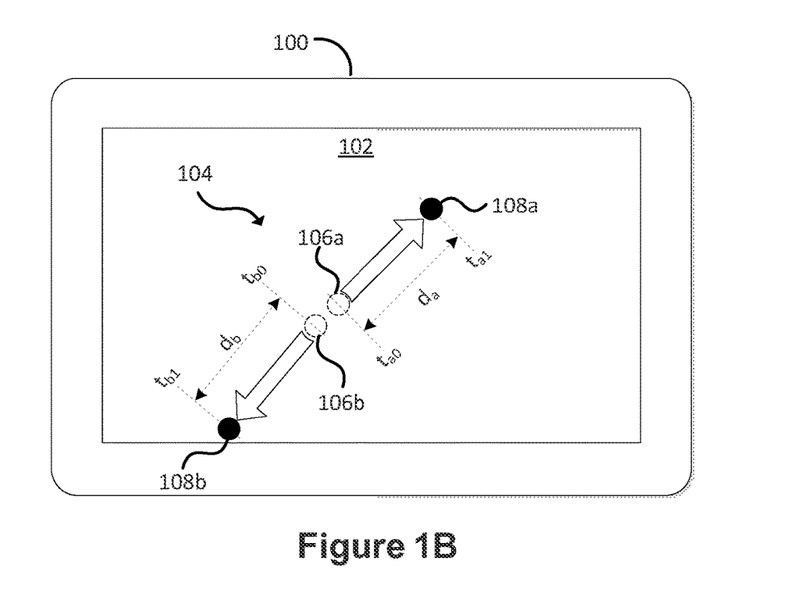
FIG. 1B depicts termination of the momentum based zoom gesture on a touch-sensitive display of an electronic device.

FIG. 1B depicts termination of the momentum based zoom gesture on a touch-sensitive display of an electronic device. The pinch gesture 104 is initiated with the contact points at the start positions 106a, 106b. The contact points are then spread apart, as depicted by arrows 108a, 108b, while maintaining contact with the touch-sensitive display 102. The pinch gesture 104 is terminated when the contact points are lifted from the touch-sensitive display 102 at the termination positions 110a, 110b. As depicted in FIG. 1B, the pinch gesture 104, or more particularly each contact point of the gesture 104, may be associated with a distance $d_a$ and $d_b$ between the respective start position 106a, 106b and termination position 110a, 110b. Although the distances $d_a$ and $d_b$ are depicted as being between the respective start positions 106a, 106b and the termination positions 110a, 110b, it is contemplated that a single distance difference may be used. The single distance may be selected from one of the contact points, may be combined from the distance differences of the two contact points, or may be provided as a difference of the distances between the two start positions 106a, 106b and the two termination positions 110a, 110b. In addition to the distance, the gesture 104, or more particularly the contact points of the gesture, may also be associated with an elapsed time $(t_{a0}-t_{a1})$, $(t_{b0}-t_{b1})$ between when the contact point was initiated and terminated. Depending upon how the distance is calculated, it will be appreciated that appropriate elapsed times can be determined. From the distance and elapsed times, a kinetic value such as a velocity or acceleration vector of the gesture 104 can be determined. The velocity or acceleration vector can be used as a momentum value for the pinch gesture. Although described as a momentum value, it is noted that the value may simply be a velocity that is used to determine how 'far' the gesture would travel, or for how long the gesture would travel for. It should be appreciated that the term momentum is used to imply that the contact points of zoom gesture have a momentum component to provide information to predict a desired zoom level to continue zooming after the gesture is terminated.

Although the above has described calculating the velocity, and momentum value, of the gesture based on the initiation and termination positions of the gesture 104, it is contemplated that positions and times could be used throughout the gesture. That is, the momentum value could be calculated as the gesture 104 is being performed.

Regardless of how the momentum value is calculated, once it is determined it is used to determine the final zoom level. The momentum value can be used as an initial velocity in a motion equation. A friction value and a weight value can be determined, or provided, for use with the initial velocity of the momentum value to determine the final zoom level. A momentum value may be determine as a single value or a value determined for each direction of the zoom.

If the momentum value is calculated using the initiation and termination positions of the contact points, the zoom gesture will be terminated once the momentum value is calculated. The termination positions 110a, 110b does not determine the final zoom level, rather the momentum value can be used to continue zooming to a further zoom level.

The final zoom level may be determined by determining an intermediate zoom level from the momentum value and then adjusting the final zoom level around the intermediate zoom level based on the content that would be displayed at the intermediate zoom level. For example, if the momentum value results in a particular zoom level that would display 95% of a region of content, the final zoom level may be adjusted so that the user interface displays 100% of the region of content. The momentum value allows the final zoom level used for displaying the content to be decoupled from the termination positions of the pinch gesture, while still allowing the pinch gesture to be used in determining the approximate zoom amount.

Although the momentum based zooming described herein can be used for zooming-in and zooming-out on different content types, it is described further below with regards to zooming in on a webpage displayed in a web browser displaying content.

Figure 2:
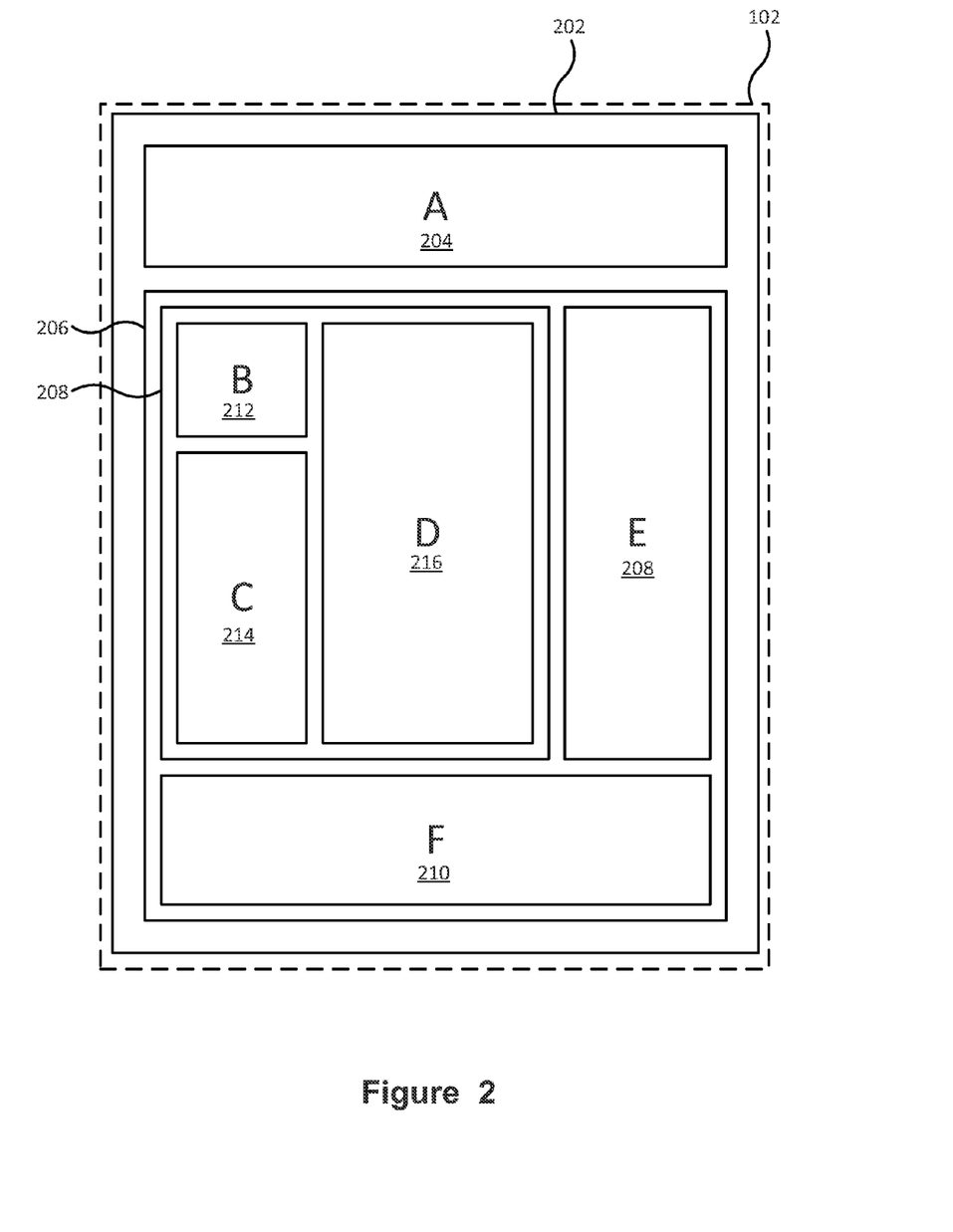
FIG. 2 depicts content displayed on the touch-sensitive display of an electronic device.

FIG. 2 depicts webpage content displayed on the touch-sensitive display of an electronic device. A webpage 202 may be displayed on the display 102 of the device. As will be appreciated, the webpage 202 can provide multiple frames, divisions, tables, sections, or regions in which to display content. Further the frames, divisions, tables, sections or regions may be nested as depicted. The content may be text, video, pictures, or graphics. The webpage 202 is depicted as comprising a header region 204 that displays content 'A' which may be a banner add, a header graphic, title text or any other content as desired. The webpage 202 further comprises a lower content region 206, which holds additional regions. The lower content region 206 may in turn comprise an upper region 208, a side region 210 and a lower region 212. The side region 210 may display content 'E'. The lower region 212 may display content 'F'. The upper region 208 may further comprise additional regions including a top-left region 214, a bottom-left region 216 and a right region 218. The top-left region 214 may display some content the bottom-left region 216 may display some content 'C' and the right region 218 may display some content 'D'. A user may interact with the webpage using common techniques and gestures; however, the user may also zoom-in and zoom-out using a momentum or kinetic based zoom gesture.

Figure 3:
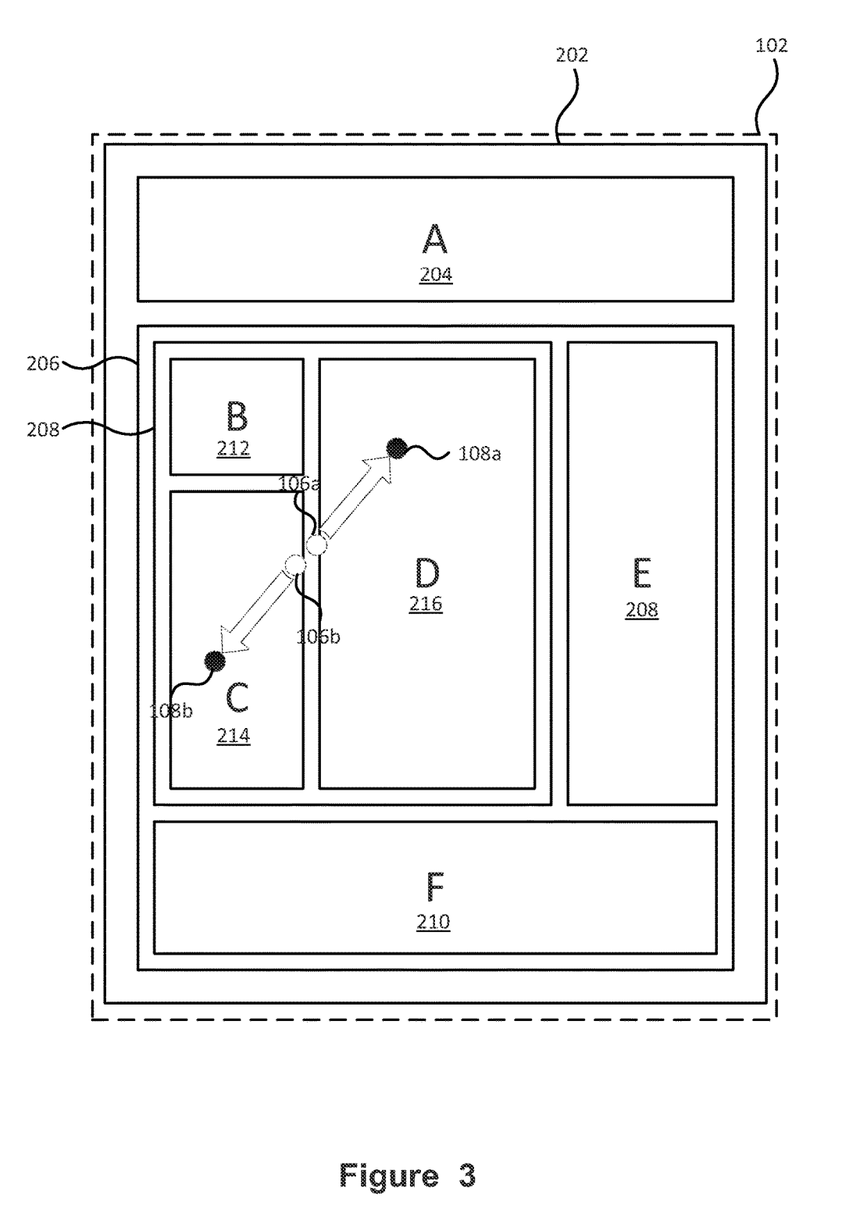
FIG. 3 depicts a momentum based zoom of the content displayed on the touch-sensitive display of an electronic device.

FIG. 3 depicts a momentum based zoom of the webpage content displayed on the touch-sensitive display of an electronic device. The webpage 202 is displayed on the display 102, or viewport defined in the display of the device 100 as described above with reference to FIG. 2. The viewport may be defined by a browser window or application interface on the display 102 of the device. A user may interact with the webpage 202, including performing the pinch gesture 104 as depicted. The pinch gesture 104 begins with the contact points at the start positions 106a, 106b. The contact points are moved 108a, 108b to the termination positions 110a, 110b over an elapsed period of time. The velocity of the gesture 104 is determined using a distance the contact points have moved over an elapsed period of time. A momentum value may then be calculated and used to determine the final zoom level to display the content at. If the momentum value Is larger, so that the user spread their fingers quickly, the content may be zoomed in a greater amount than if the momentum value is smaller. The animation of the zoom transition may be adjusted on-the-fly to accommodate the determined final zoom level, for example a friction value associated with the animation is adjust to provide a smooth zoom to the final zoom level.

Figure 4:
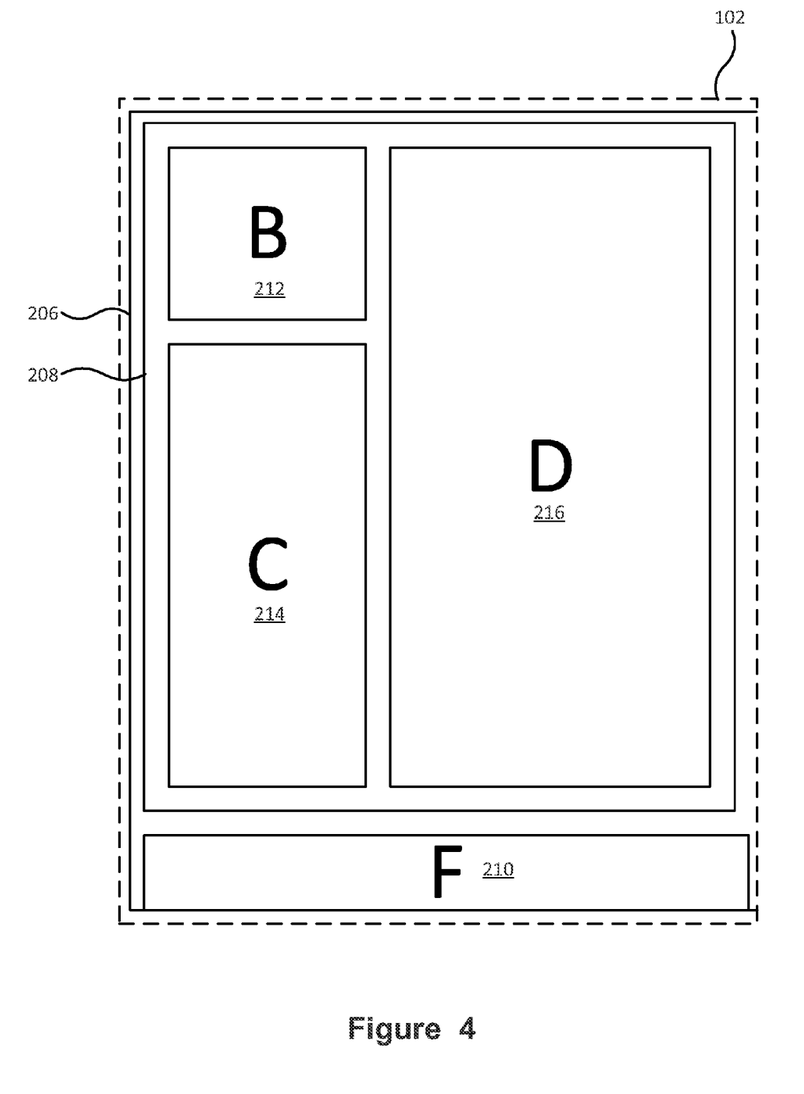
FIG. 4 depicts the display of the content at a final zoom level.

FIG. 4 depicts the display of the content at a first final zoom level. The final zoom level to display the content at is determined so that the upper region 208 is displayed in the display 102 or viewport. In determining the final zoom level, the momentum value may be used to determine an intermediate zoom level, which may be greater or less than the final zoom level. The content that would be displayed at the intermediate zoom level can be determined. A section or region of interest, such as the upper region 208, can be determined from the content that would be displayed, and the final zoom level determined to better display the section or region of interest.

In addition to displacement of the contact points for the pinch gesture 104, the contact points may also include a translation component that shifts the content displayed. When determining the content that will be displayed, the translation components may be included. The content displayed at the final zoom may be also be shifted by an amount that differs from the translation amount of the gesture 104 so that the content displayed is aligned to a viewport of the user interface.

Figure 5:
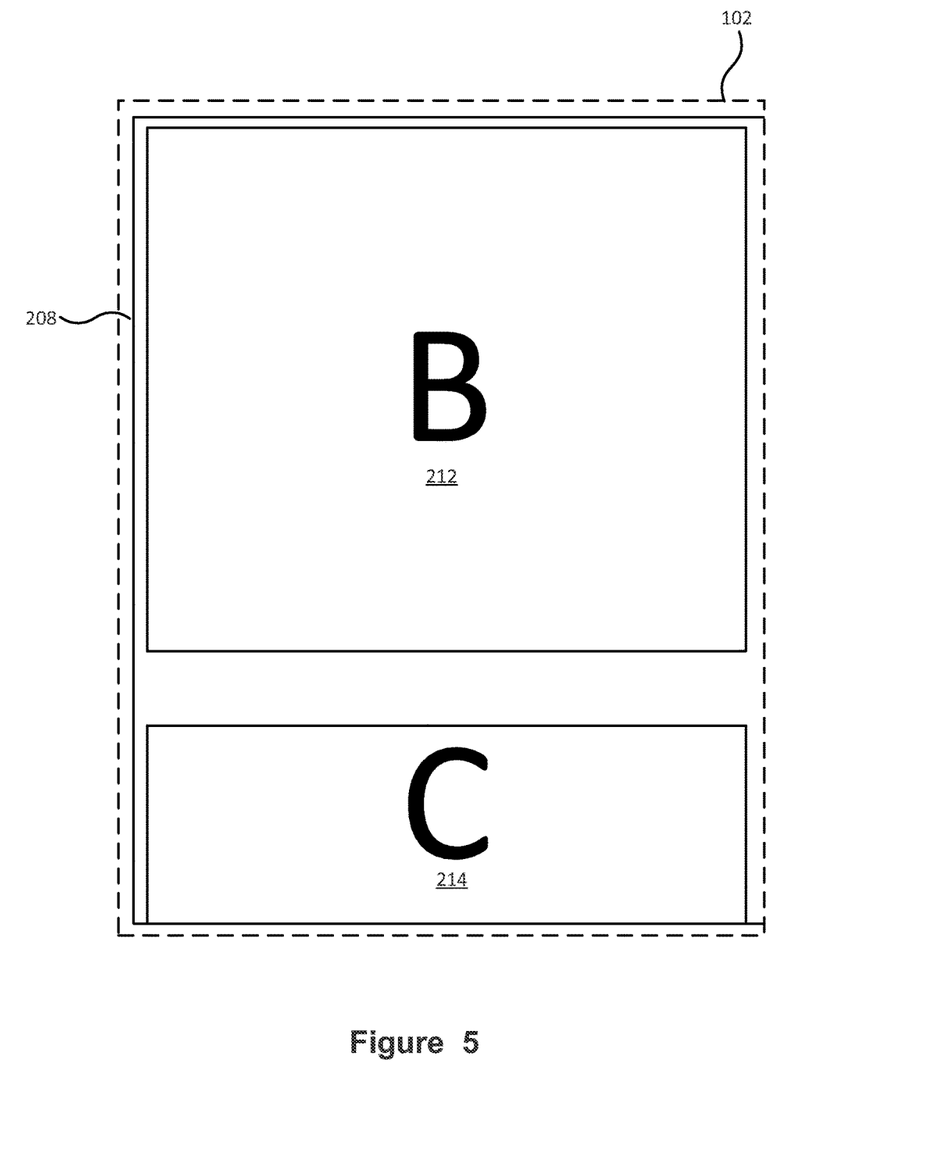
FIG. 5 depicts the display of the content at another final zoom level.

FIG. 5 depicts the display of the webpage content at another final zoom level. The webpage content displayed may result from substantially the same pinch gesture 104 described with reference to FIG. 3; however, as depicted, the final zoom level is greater than that of FIG. 4. As such, the pinch gesture 104 resulting in the display of FIG. 5 may have been performed faster, so that a larger momentum value was calculated resulting in a larger zoom amount being applied. The final zoom level, and the final position alignment can be determined so that a section or region of interest is displayed at an appropriate zoom level for viewing the section or region of interest and so that it is aligned appropriately.

Figure 6:
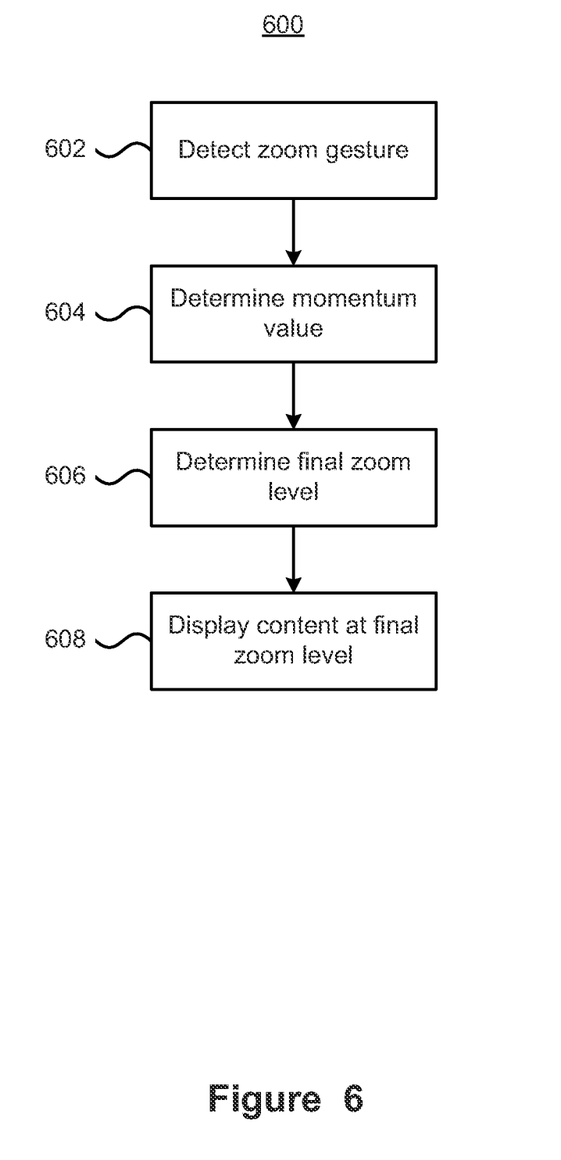
FIG. 6 depicts a method for interacting with a user interface displaying content.

FIG. 6 depicts a method for interacting with a user interface displaying content. The method 600 begins with detecting a zoom gesture (602). The detection of the zoom gesture may occur once the contact points are terminated, such as by removal from the touch-sensitive display, alternatively, the detection of the zoom gesture may occur during the movement of the contact points. Regardless of when the zoom gesture is detected, once it is, a momentum value is determined (604). The momentum value may be determined based on an amount of distance traveled by at least one of the contact points over an elapsed period of time. That is the momentum value may be determined as a velocity of one or more of the contact points of the gesture. Once the momentum value is determined, a final zoom level can be determined from the momentum value (606). The final zoom level can be determined from the momentum value using a motion equation. The motion equation may include a friction value and a weight value. Determining the final zoom level can be based on how long a mass, travelling at the velocity of the momentum value would take to stop on a surface having a friction value. The length of time may then be translated into a zoom level, or zoom amount to zoom from the current zoom level. Once the final zoom level is determined, the content is displayed in the user interface at the determined final zoom level (608).

Figure 7:
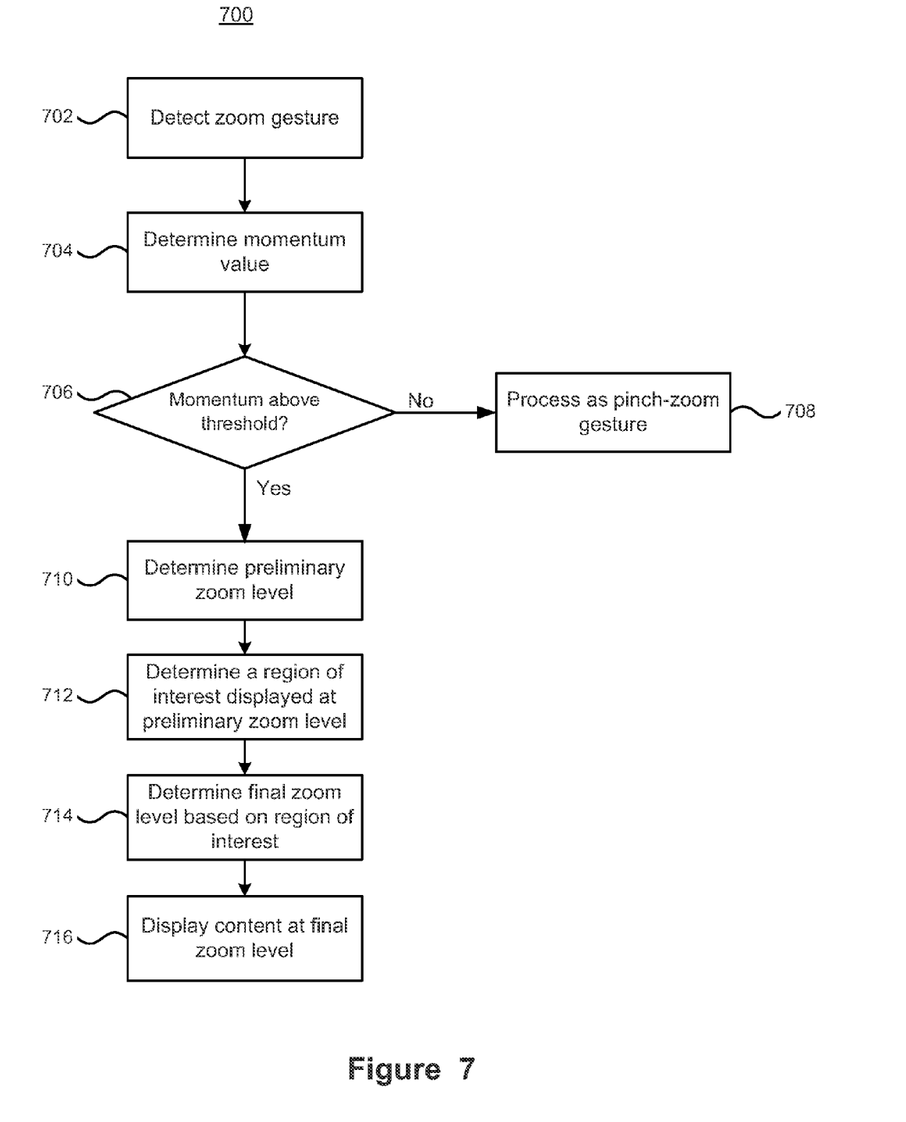
FIG. 7 depicts a further method for interacting with a user interface displaying content.

FIG. 7 depicts a further method for interacting with a user interface displaying content. The method 700 begins in the same manner as method 600 described above. That is, the method 700 detects a zoom gesture 602 and then determines a momentum value (604). However, the method 700 differs in that, once the momentum value is determined, the method determines if the momentum value is above a set threshold (706). If the momentum value is not above the set threshold (No at 706), the zoom gesture is processed as a pinch-to-zoom gesture (708) in which the final zoom level is determined as the termination position of the contact points.

If the momentum value is above the set threshold value (Yes at 706), then the method determines a preliminary zoom level (710). The preliminary zoom level can be determined in the same manner as described above with regards to determining the final zoom level (606). Once the preliminary zoom level is determined, a region of interest is determined (712). The region of interest is determined based on the content that would be displayed at the preliminary zoom level. For example, the region of interest may be a division, table cell, frame, section, region or element that would be at least partially visible at the preliminary zoom level. Once the region of interest is determined, a final zoom level can be determined based on the region of interest (714). The final zoom level may be determined so that the region of interest is appropriately displayed on the user interface. The final zoom level can be determined by adjusting at least one dimension of the region to fit to the display or viewport. For example the region may be may be scaled or moved by its length and/or width. Once final zoom level is determined, the animation of the transition can be adjusted to provide a smooth display of the content at the final zoom level (716).

Figure 8:
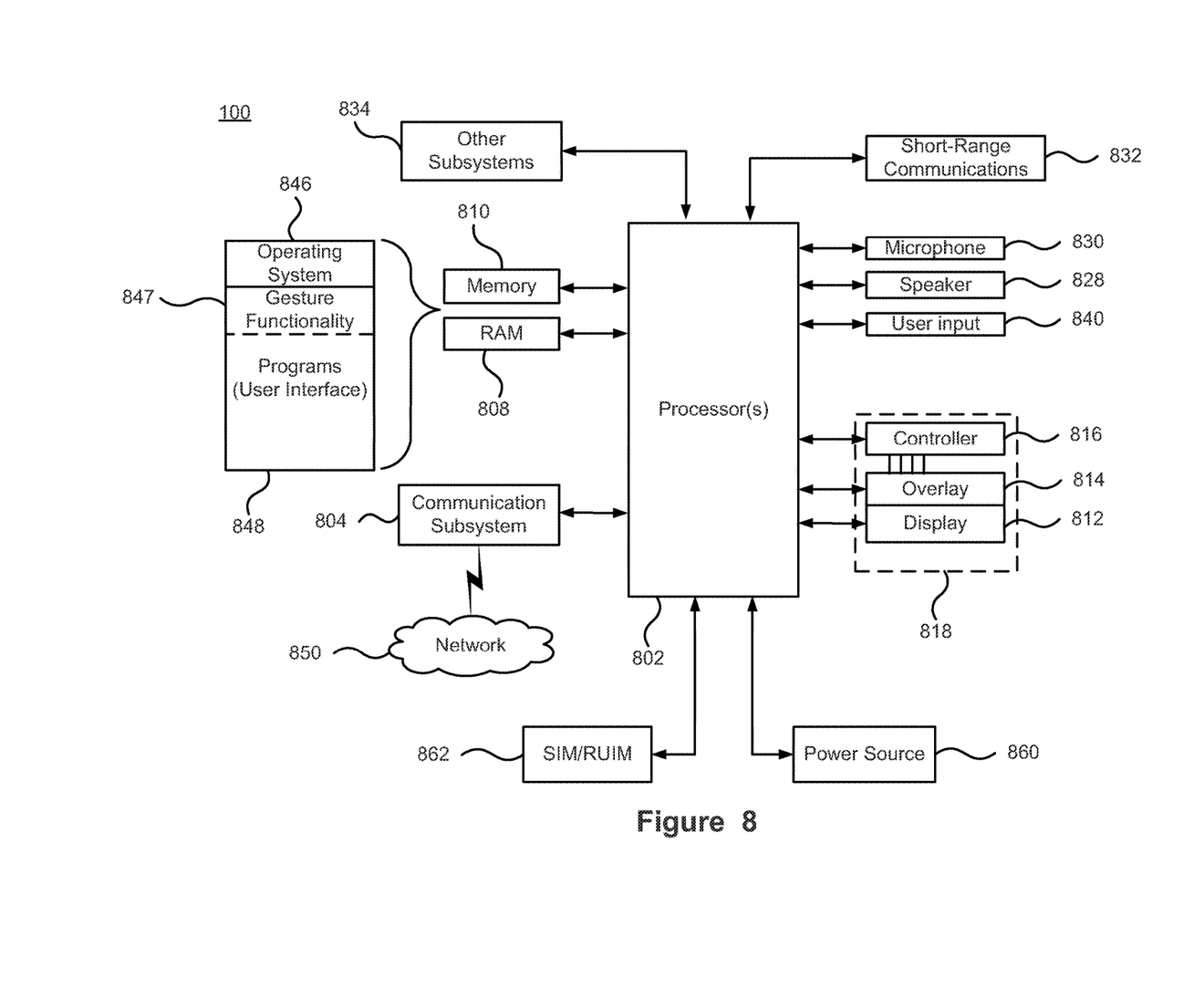
FIG. 8 depicts an electronic device having a touch-sensitive display for interacting with a user interface displaying content.

FIG. 8 depicts an electronic device having a touch-sensitive display for interacting with a user interface displaying content. As shown by way of example in FIG. 8, the electronic device 100, includes a processor (or microprocessor) 802 for executing instructions, including instructions for providing one or more applications, memory in the form of flash memory 810 and RAM 808 (or any equivalent memory devices) for storing an operating system 846 and one or more applications, components or functionalities 848 providing the graphical user interface with which the user interacts with the device, including functionality for a momentum based zoom gesture. The processor receives power from a power supply 860, which may be a direct connection or provided by a battery source.

As shown by way of example in FIG. 8, the electronic device 100 may include a communication subsystem 804 which provides radiofrequency (RF) transceiver to communicate through a wireless network 850. The electronic device 100 may be in a portable form factor such as a smart phone, tablet, netbook, laptop, ultrabook, portable computing device or an integrated mobile computer device. The electronic device 100 may access wired or wireless networks to transmit and retrieve data. The RF transceiver for communication with a wireless network 850 using a wireless communication protocols such as, for example but not limited to, GSM, UMTS, LTE, HSPDA, CDMA, W-CDMA, Wi-MAX, Wi-Fi etc. A subscriber identity module (SIM) card 862 may be provided depending on the access technology supported by the device. The communication subsystem 804 may also provide wired communication through a network.

Optionally, where the device is a voice-enabled communications device such as, for example, a tablet, smart-phone or cell phone, the device would further include a microphone 830 and a speaker 828. Short-range communications 832 is provided through wireless technologies such as Bluetooth™ or wired Universal Serial Bus™ connections to other peripheries or computing devices or by other device sub-systems 834 which may enable access tethering using communications functions of another mobile device. In a tethering configuration the electronic device 100 may provide the network information associated with the tethered or master device to be used to access the network. The device 100 may optionally include a Global Positioning System (GPS) receiver chipset or other location-determining subsystem.

The operating system 846 and the software components that are executed by the microprocessor 802 are typically stored in a persistent store such as the flash memory 810, which may alternatively be a read-only memory (ROM) or similar storage element (not shown). Those skilled in the art will appreciate those portions of the operating system 846 and the software components, such as specific device applications, or parts thereof, may be temporarily loaded into a volatile store such as the RAM 808. Other software components can also be included, as is well known to those skilled in the art.

User input 840 may be provided by integrated input devices such as a keyboard, touchpad, touch screen, mouse, camera or positing apparatus to actuate transitions. The electronic device 100 may have an integrated touch-sensitive display 818 having a display screen 812, with a touch-sensitive overlay 814 coupled to a controller 816 for enabling interaction with the electronic device 100. The display portion of the electronic device 100 may not necessarily be integrated but may be coupled to the electronic device 100. Although a touch-sensitive GUI interface has been described the described system and methods may be applied to gesture based interfaces, for example by using a camera input or three-dimensional input devices.

Although certain methods, apparatus, computer readable memory, and articles of manufacture have been described herein, the scope of coverage of this disclosure is not limited thereto. To the contrary, this disclosure covers all methods, apparatus, computer readable memory, and articles of manufacture fairly falling within the scope of the appended claims either literally or under the doctrine of equivalents.

Although the following discloses example methods, system and apparatus including, among other components, software executed on hardware, it should be noted that such methods, system and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods, system and apparatus.

What is claimed is:

1. A method for interacting with a user interface displaying content on a display of an electronic device, the method comprising:
   detecting a zoom gesture to modify a zoom level of the content displayed on the user interface, the zoom gesture comprising two contact points, wherein the zoom gesture includes a translation component defining a shift of the content displayed on the user interface;
determining a momentum value for the zoom gesture using a distance traveled by at least one contact point during the zoom gesture and an elapsed time from when the gesture was initiated to when the gesture is terminated;
determining whether the momentum value is above a threshold;
when the momentum value is above the threshold, using a motion equation to compute a time a mass travelling at a velocity corresponding to the momentum value would take to stop on a surface having a friction value;
determining a final zoom level by adjusting a current zoom level by an amount proportional to the computed time; and
displaying the content on the user interface at the determined final zoom level, wherein displaying the content comprises:
shifting the content according to the translation component; and
shifting the content until the content is aligned to a viewport of the user interface;
when the momentum value is below the threshold, processing the zoom gesture as a pinch-to-zoom gesture.

2. The method of claim 1, wherein displaying the content comprises aligning one of a plurality of blocks of content to the viewport.

3. The method of claim 1, wherein displaying the content comprises:
determining the friction value from e momentum value; and
adjusting an animation of a transition to the content displayed at the final zoom level using the determined friction value.

4. The method of claim 1, wherein determining the final zoom level comprises:
determining a preliminary zoom level based on the determined momentum value of the zoom gesture;
determining a region of interest in the content that would be at least partially visible at the preliminary zoom level; and
determining the final zoom level based on the determined region of interest in the content.

5. The method of claim 4, wherein the region of interest is based on locations of at least two contact points defined by the zoom gesture.

6. The method of claim 1, wherein the content comprises a plurality of regions, wherein determining the final zoom level comprises:
determining a preliminary zoom level based on the determined momentum value of the zoom gesture;
determining a first region of interest of content that would be displayed at the preliminary zoom level; and
determining the final zoom level so that at least one dimension of the region of interest will be fully displayed.

7. The method of claim 6, wherein the content is displayed in a webpage wherein the regions are defined by one or more of frames, sections, divisions, table cells, or elements within the webpage.

8. The method of claim 1, wherein the zoom gesture is a pinch zoom.

9. The method of claim 8, wherein the momentum value is determined with one or more vectors defined between start and end positions of each of the two contact points.

10. The method of claim 8, wherein the zoom gesture comprises relative movement of two contact points, each contact point comprising a start position where the contact is initiated and an end position where the contact is terminated, wherein the momentum value is determined from the elapsed time between at least one of the contact points moving from the start position to the end position.

11. The method of claim 8, wherein the momentum value is determined from a distance traveled by at least one of the contact points during the elapsed time.

12. A device for displaying content, the device comprising:
a display for displaying a user interface;
a processor for executing instructions; and
a memory for storing instructions for execution by the processor, the instructions when executed by the processor configuring the device to:
detect a zoom gesture to modify a zoom level of the content displayed on the user interface, the zoom gesture comprising two contact points, wherein the zoom gesture includes a translation component defining a shift of the content displayed on the user interface;
determine a momentum value for the zoom gesture using a distance traveled by at least one contact point during the zoom gesture and an elapsed time from when the gesture was initiated to when the gesture is terminated;
determine whether the momentum value is above a threshold;
when the momentum value is above the threshold, using a motion equation to compute a time a mass travelling at a velocity corresponding to the momentum value would take to stop on a surface having a friction value;
determine a final zoom level by adjusting a current zoom level by an amount proportional to the computed time; and
display the content on the user interface at the determined final zoom level, wherein displaying the content comprises:
shifting the content according to the translation component; and
shifting the content until the content is aligned to a viewport of the user interface;
when the momentum value is below the threshold, processing the zoom gesture as a pinch-to-zoom gesture.

13. The device of claim 12, wherein configuring the device to display the content comprises configuring the device to align one of a plurality of blocks of content to the viewport.

14. The device of claim 12, wherein configuring the device display the content comprises configuring the device to:
determine the friction value from the momentum value; and
adjusting an animation of a transition to the content displayed at the final zoom level using the determined friction value.

15. The device of claim 12, wherein configuring the device to determine the final zoom level comprises configuring the device to:
determine a preliminary zoom level based on the determined momentum value of the zoom gesture;
determine a region of interest in the content that would be at least partially visible at the preliminary zoom level; and
determine the final zoom level based on the determined region of interest in the content.

16. The device of claim 15, wherein the region of interest is based on locations of at least two contact points defined by the zoom gesture.

17. The device of claim 12, wherein the content comprises a plurality of regions, wherein configuring the device to determine the final zoom level comprises configuring the device to:
- determine a preliminary zoom level based on the determined momentum value of the zoom gesture;
- determine a first region of interest of content that would be displayed at the preliminary zoom level; and
- determine the final zoom level so that at least one dimension of the region of interest will be fully displayed.

18. The device of claim 17, wherein the content is displayed in a webpage wherein the regions are defined by one or more of frames, sections, divisions, table cells, or elements within the webpage.

19. The device of claim 12, wherein the momentum value is determined by one or more vectors defined between start and end positions of each of two contact points.

20. The device of claim 12, wherein the zoom gesture comprises relative movement of two contact points, each contact point comprising a start position where the contact is initiated and an end position where the contact is terminated, wherein the momentum value is determined from the elapsed time between at least one of two contact points moving from the start position to the end position.

21. A non-transitory computer readable memory containing instructions for interacting with a user interface displaying content on a display of an electronic device, the instructions when executed by a processor performing the method comprising:

- detecting a zoom gesture to modify a zoom level of the content displayed on the user interface, the zoom gesture comprising two contact points, wherein the zoom gesture includes a translation component defining a shift of the content displayed on the user interface;
- determining a momentum value for the zoom gesture using a distance traveled by at least one contact point during the zoom gesture and an elapsed time from when the gesture was initiated to when the gesture is terminated;
- determining whether the momentum value is above a threshold;
- when the momentum value is above the threshold, using a motion equation to compute a time a mass travelling at a velocity corresponding to the momentum value would take to stop on a surface having a friction value;
- determining a final zoom level by adjusting a current zoom level by an amount proportional to the computed time; and
- displaying the content on the user interface at the determined final zoom level, wherein displaying the content comprises:
  - shifting the content according to the translation component; and
  - shifting the content until the content is aligned to a viewport of the user interface;
- when the momentum value is below the threshold, processing the zoom gesture as a pinch-to-zoom gesture.

* * * * *